(12) United States Patent
Dunleavy et al.

(10) Patent No.: US 8,542,191 B2
(45) Date of Patent: Sep. 24, 2013

(54) FILM LAYER, ASSEMBLY AND METHOD FOR ALTERING THE APPEARANCE OF A MOBILE STATION

(75) Inventors: Tom Dunleavy, Oxnard, CA (US); Jukka Kela, Beijing (CN); Kelley Lee, Pasadena, CA (US)

(73) Assignee: Nokia Corporation, Espoo (FI)

( * ) Notice: Subject to any disclaimer, the term of this patent is extended or adjusted under 35 U.S.C. 154(b) by 2807 days.

(21) Appl. No.: 10/462,561

(22) Filed: Jun. 16, 2003

(65) Prior Publication Data
US 2004/0253998 A1 Dec. 16, 2004

(51) Int. Cl.
*G09G 5/00* (2006.01)

(52) U.S. Cl.
USPC ............ 345/168; 345/170; 345/172; 345/173

(58) Field of Classification Search
USPC ......... 345/170, 172–173, 168, 156; 349/199; 341/22–23
See application file for complete search history.

(56) References Cited

U.S. PATENT DOCUMENTS

| | | | | |
|---|---|---|---|---|
| 3,816,209 | A | * | 6/1974 | DeWoskin et al. ............ 156/251 |
| 3,838,229 | A | | 9/1974 | Morrell et al. |
| 4,292,481 | A | | 9/1981 | Barnes et al. |
| D262,214 | S | | 12/1981 | Obst |
| 4,859,261 | A | * | 8/1989 | Ace ............................... 156/102 |
| 5,113,955 | A | * | 5/1992 | Wallisch et al. ............ 177/25.15 |
| 5,138,119 | A | | 8/1992 | Demeo |
| 5,818,492 | A | * | 10/1998 | Look .............................. 347/171 |
| 6,310,609 | B1 | | 10/2001 | Morgenthaler |
| 6,321,441 | B1 | * | 11/2001 | Davidson et al. ................ 29/622 |
| 6,466,299 | B1 | * | 10/2002 | Lehtiniemi et al. ............ 349/199 |
| 2002/0013132 | A1 | * | 1/2002 | Newstead et al. ................ 455/90 |
| 2003/0054854 | A1 | * | 3/2003 | Kela et al. ...................... 455/550 |
| 2003/0203219 | A1 | * | 10/2003 | Lin et al. ........................ 428/457 |
| 2004/0139680 | A1 | * | 7/2004 | Hambright ....................... 52/578 |
| 2004/0175527 | A1 | * | 9/2004 | Shiota et al. .................... 428/43 |

FOREIGN PATENT DOCUMENTS

| | | |
|---|---|---|
| CN | 2383142 Y | 6/2000 |
| DE | 201 04 924 U1 | 10/2001 |

OTHER PUBLICATIONS

Communication in connection with examination of corresponding European Application No. 04 754 635.3; Dated: Jul. 21, 2010; 5 sheets.

* cited by examiner

*Primary Examiner* — William Boddie
*Assistant Examiner* — Leonid Shapiro
(74) *Attorney, Agent, or Firm* — Alston & Bird LLP

(57) ABSTRACT

A film layer for a mobile station that allows the appearance of the mobile station to be easily changed. The layer is thin enough to allow it to be positioned between the plungers on a plunger mat and the keys on a key mat of the mobile station. Flexibility of the film layer allows a key press to be transmitted through the film insert to one of the plungers, which in turn compresses a contact on a printed wiring board. Flexibility may be due to perforations around the keys of the key mat. Preferably, the film layer includes some visually detectable characteristic, such as a color, that is visible through openings or translucent portions of the key mat. The film layer may be constructed of various materials, such as paper, elastomer, polymer or electric luminescent materials which can be interchangeably inserted into the mobile station to change its appearance.

21 Claims, 4 Drawing Sheets

FILM LAYER, ASSEMBLY AND METHOD FOR ALTERING THE APPEARANCE OF A MOBILE STATION

BACKGROUND OF THE INVENTION

1. Field of the Invention

The present invention is related to the manufacture and use of mobile stations (e.g., mobile telephones), and more particularly to interchangeable components for varying the appearance of the mobile stations.

2. Description of Related Art

Participants in the mobile telephone industry are in a constant search to differentiate their telephones by making them easier to use and more aesthetically appealing. For example, mobile telephones have been developed with easily interchangeable covers. An interchangeable cover allows the user to change the appearance of the phone as desired, such as by matching the cover to an outfit. Of course, the color or appearance of the cover is generally limited to commercially available colors so true customization by the user is not possible.

As another example, U.S. Pat. No. 6,310,609 discloses a user-interface with guide lights. The user interface includes a means for identifying the appropriate keys on the key mat which correspond to the step or steps required to activate a desired operation to be performed by the device. Identification of the appropriate keys is achieved using a light source which is mounted beneath each translucent key so that when the light source is illuminated, the key associated with that light source will be identifiable by the user.

The intensity of the light sources is variable and may be controlled to provide sufficient contrast to read all keys in low ambient light while highlighting the keys to be pressed for operation of the desired function. In high ambient light, the intensity of the guide lights may be increased for enhanced contrast and visibility. Alternatively, different color light sources may be used, with one color to light all keys for visibility in low ambient light, if needed, and the other color to provide the guide lights.

In yet another example, U.S. Pat. No. 6,466,299 discloses a cover for a mobile station constructed using thermochromic crystals. The thermochromic crystals are sensitive to changes in temperature, responding to such changes with changes in color. Application of the crystals to the cover of the station, or the keys on the key mat, allows the user to see which of the keys have been pressed or whether the phone has been recently used without authorization. In addition, the color changes have the advantage of being aesthetically attractive, differentiating the telephones from others on the market.

Despite all of the above-listed improvements in mobile station appearance and function, further improvements are still desirable.

It would therefore be advantageous to have a mobile station with an improved aesthetic appearance. It would be further advantageous to have a mobile station with an easily alterable aesthetic appearance. In addition, it would be advantageous if the aesthetic appearance could be non-commercially customized by the user.

BRIEF SUMMARY OF THE INVENTION

The present invention addresses the above needs and achieves other advantages by providing a film layer for a mobile station that allows the appearance of the mobile station to be easily changed. The film layer is positioned between the plungers of a plunger mat and the keys of a key mat of the mobile station. Flexibility of the film layer allows a key press to be transmitted through the film layer to one of the plungers, which in turn compresses a contact on a printed wiring board. Such flexibility may be implemented, or aided, by lines or areas of weakness (e.g., perforations) in the film layer that extend at least partially around the keys of the key mat. Preferably, the film layer includes some visually detectable characteristic, such as its color or a symbol, that is visible through openings or translucent portions of the key mat and/or a cover of the mobile station. Various materials may be used to construct the film layer, such as paper, elastomer, polymer or electric luminescent materials which can be interchangeably inserted into the mobile station to change its appearance. The keys may extend over a sufficient area to cover multiple plungers, so as to improve visibility of the film layer under the keys.

A mobile station of one embodiment of the present invention includes a housing and a wireless communications signal processing assembly positioned in the housing. The signal processing assembly has a plurality of pressure-sensitive areas, each of which is capable of registering an input. A film layer is positioned in the housing so as to overlie the pressure-sensitive areas of the signal processing assembly and includes at least one visually detectable characteristic. Also positioned in the housing is a key mat overlying the film layer. The key mat has a plurality of keys wherein each of the keys is positioned relative to a corresponding one of the pressure sensitive areas. In this manner, depression of a key deflects a portion of the film layer and similarly depresses the corresponding pressure-sensitive area.

Preferably, the film layer has at least one visually detectable characteristic (e.g., one or more colors, symbols, patterns or luminescent qualities). In this aspect, one or more portions of the housing of the mobile station, or the key mat, are sufficiently translucent to allow viewing of the visually detectable characteristic. For instance, the keys of the key mat and/or portions of a top cover of the housing may be constructed of optically transparent silicone.

The signal processing assembly may include a printed wiring board and a plunger mat. The printed wiring board has a plurality of contacts and the plunger mat has a plurality of plungers correspondingly positioned so as to overlie the contacts. Together, the contacts and the plungers define the pressure sensitive areas.

The film layer may have characteristics that facilitate deflection of the film layer in proximity to the keys. For instance, the film layer may include weakened areas in proximity to the keys. Such weakened areas may include areas of thinner material, areas of greater flexibility or areas surrounded by perforation lines. The perforation lines can be full or partial depth perforations defined in the film layer. The perforation lines may extend around at least a portion of a periphery of each of the keys so as to provide additional flexibility while being masked by an overlying portion of the housing.

In another embodiment, the present invention includes an assembly for custom manufacture of a film layer that alters a visual appearance of a mobile station. Included in the assembly is a film blank having a visually detectable characteristic. Also included in the assembly is a die having a cutting edge capable of cutting through the film blank to form the film layer. In addition, the cutting edge is shaped to cut the film in a size and shape to overlie at least some of the plungers of a plunger mat of the mobile station.

In another aspect, the cutting edge may be configured to cut perforations in the film blank that form areas of weakness in the film layer. The cutting edges may be further configured to cut perforations that extend at least partially around a periphery of each one of a plurality of keys of a key mat corresponding to the plungers. Optionally, the film blank may be capable of bearing print or symbols applied by a printer.

The present invention has many advantages. The flexibility of the film layer allows for key presses to be transmitted through to the plungers of the plunger mat. The film layer allows quick, easy and inexpensive changes to the appearance of a mobile station. Customization can even be performed on an individual level using practically any available film material. Also, the film material may bear indicia or symbols of ownership so as the promote a distributor or third-party. Separation of the plunger mat from the key mat allows the film layer to be seen through the keys. Use of a transparent silicone for the key mat promotes visibility of the film layer. In addition, use of broad keys that cover multiple plungers allows the film layer to be seen in relatively large, unbroken portions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
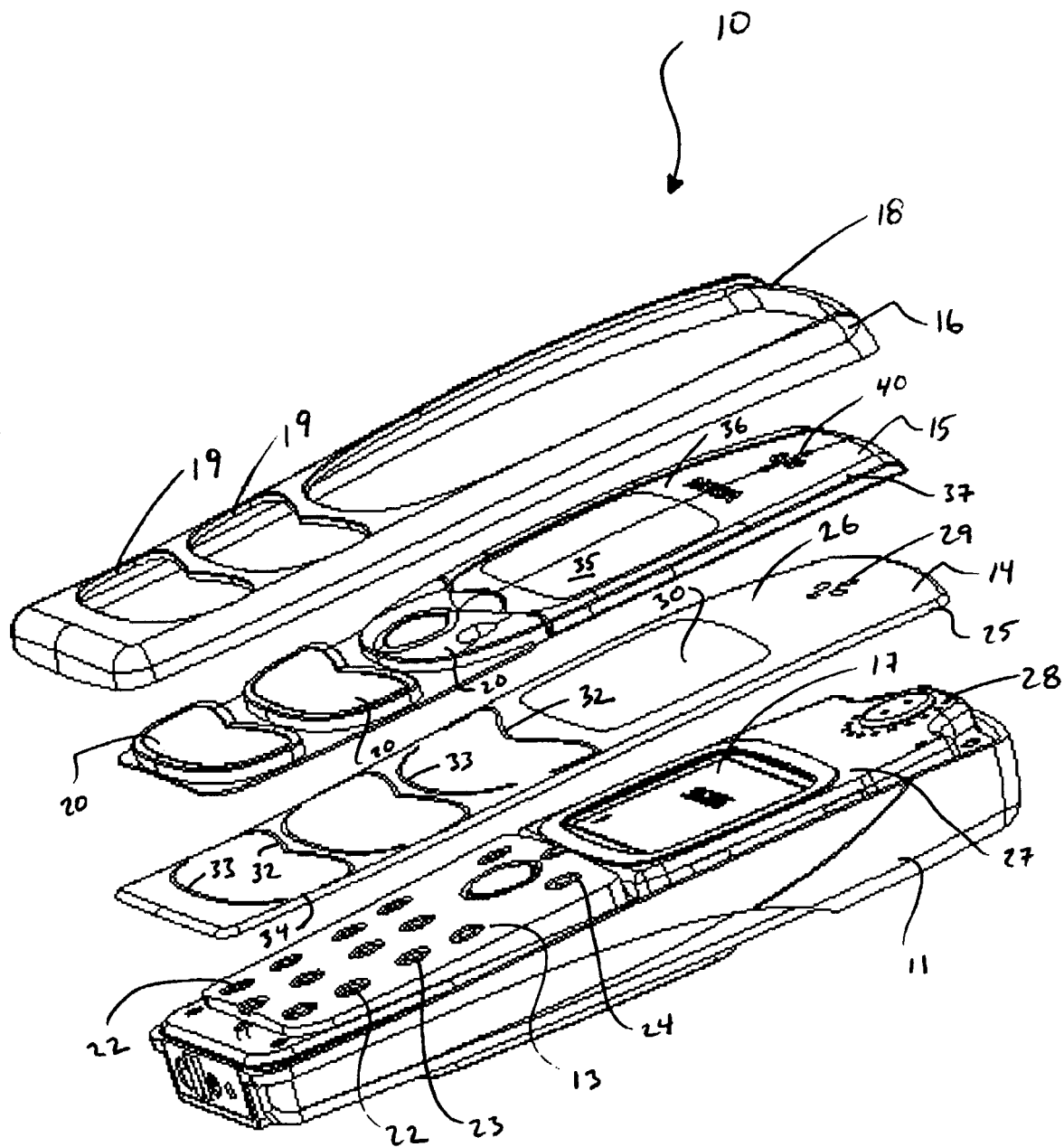
FIG. 1 is an exploded view of a mobile station of one embodiment of the present invention.

A mobile station 10 of one embodiment of the present invention is shown in the exploded view of FIG. 1. Among other components, the mobile station includes a bottom cover 11, a printed wiring or other circuit board 12 (shown in an alternative embodiment illustrated in FIG. 4), a plunger mat 13, a film layer 14, a key mat 15 having a plurality of keys 20, a top cover 16 and a display or view screen 17. Advantageously, the visual appearance of the mobile station can be changed or customized by a user by exchanging the film layer 14 for other film layers, as will be described in more detail below.

It should be understood, that the mobile telephone illustrated and hereinafter described is merely illustrative of one type of mobile station that would benefit from the present invention and, therefore, should not be taken to limit the scope of the present invention. For example, other types of mobile stations, such as portable digital assistants (PDAs), pagers, laptop computers and other types of voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

The bottom cover 11 and top cover 16 together form a housing for the remaining portions of the mobile station 10. In other words, the covers collectively form a protective case in which the printed wiring board 12, plunger mat 13, film layer 14, etc. are housed. Although the top cover may be constructed in various manners, the top cover may have a roughly rectangular shape with relatively thin walls formed of a plastic material. A plurality of openings are defined in the top cover, including a display opening 18 and a plurality of key openings 19.

In the illustrated embodiment, the display opening 18 is the largest opening and is defined by the upper portion of the top cover. In addition to providing an opening for visibility of the view screen 17, a lower portion of the display opening allows protrusion of one of the keys 20 of the key mat 15. Each of the key openings 19 allows a respective one of the remaining two keys 20 to protrude and be accessible through the top cover 16. In the illustrated embodiment, the top cover 16 also has side walls long enough to extend over the film layer 14 and the key mat 15.

The bottom cover 11 of the illustrated embodiment mates with the top cover 16 and holds the plunger mat 13, the printed wiring board 12, the view screen 17 and other conventionally known components (battery, microphone, processor, etc.) necessary for the mobile station to receive, process and generate wireless communications signals. Collectively, these components will be referred to herein as a wireless communications signal processing assembly which, being known to those of skill in the art, are not described in greater detail herein.

Both the bottom and top covers 11, 16 are preferably constructed of a relatively hard plastic material that is both light weight and protective. The covers, and in particular the top cover, may also be constructed partially or entirely of a translucent or transparent material that allows viewing of the film layer 14, as described below. In addition, the housing is not necessarily limited to a collection of covers or any particular shape, material or configuration as long as the remaining components of the mobile station 10 are held together in a manner sufficient to operate.

Figure 4:
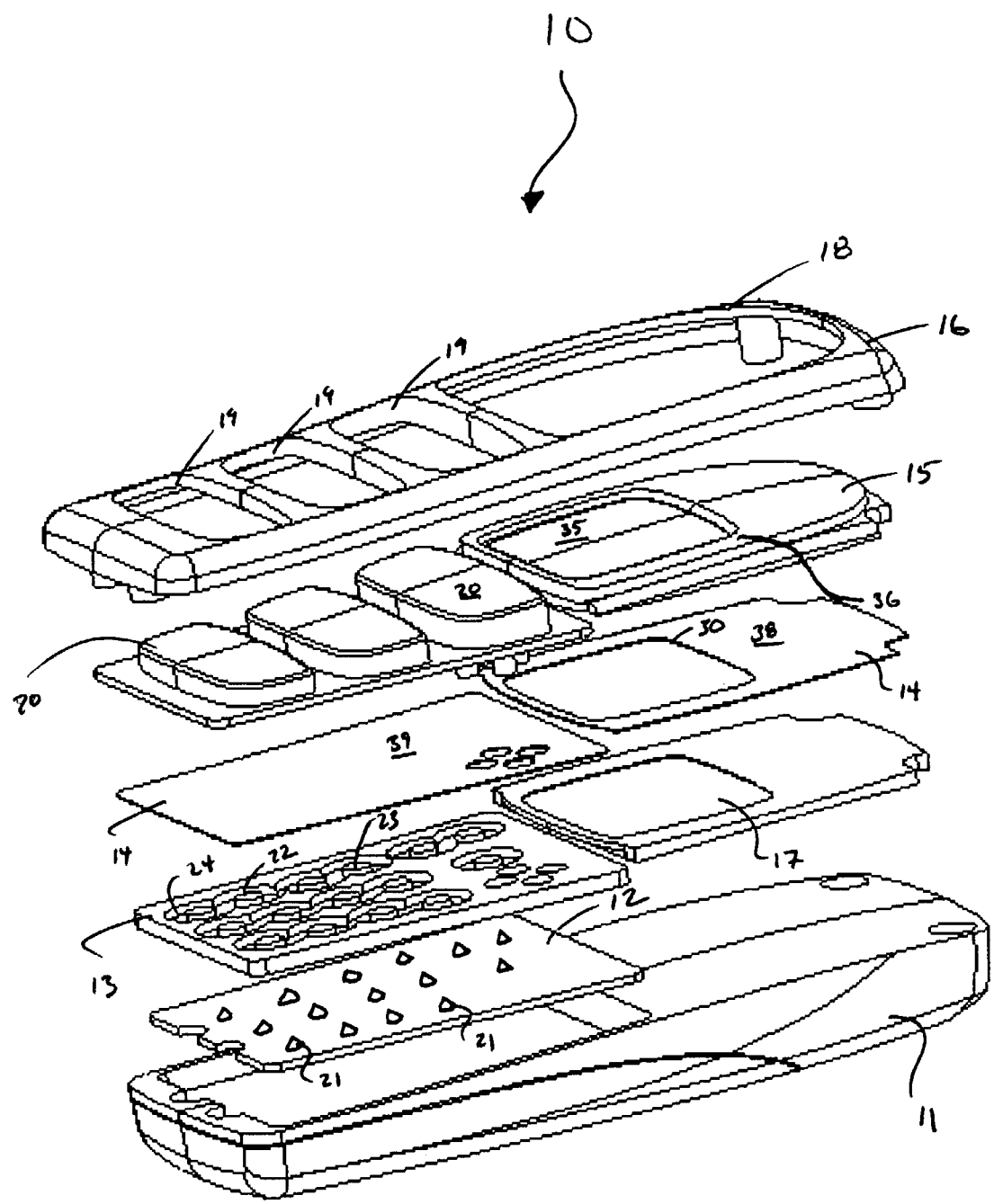
FIG. 4 is another embodiment of a mobile station, including a film layer separated into two sheets.

The printed wiring board 12, as shown in the alternative embodiment of FIG. 4, includes a plurality of metal dome contacts 21 that allow a user to provide inputs to the processing assembly. Each of the contacts performs one or more allotted input functions, such as entry of a number for dialing or paging through menu selections. Movement of the dome contacts 21 is preferably in fractions of a millimeter, and more preferably 0.2 mm or less (in the vertical direction for the orientation of the mobile station 10 depicted in FIG. 1) allowing relatively small movements to register an input.

The plunger mat 13 includes a plurality of plungers 22 and is positioned so as to extend over the contacts 21 of the printed wiring board 12. Although it may be configured in different manners, each of the plungers 22 of the illustrated embodiment includes a central disk portion 23 around which extends a conical skirt 24 which exerts a bias on the central disk portion that extends in a direction away from the printed wiring board 12, i.e., upward in the orientation of FIG. 1. Each of the plungers 22 is positioned above a corresponding one of the dome contacts 21 of the printed wiring board 12. In addition, each of the plungers 22 is isolated from the remaining plungers so as to reduce mechanical cross talk between the plungers.

During the application of pressure from one of the keys 20, the bias of the conical skirt 24 is overcome and the disk portion 23 is depressed. As the plunger is depressed, contact is made with the underlying dome contact 21 and an input is detected by the printed wiring board 12. Preferably the plunger mat 13 is constructed of an elastic material to facilitate exertion of bias by the skirt 24 and flexibility during the depression of a key. For instance, silicone could be liquid injection or compression molded to form the mat 13 and the plungers 22 thereon. Other materials, however, could also be used such as a metal foil or other polymers.

It should be noted that in addition to the contacts 21 and plungers 22, other devices could be used to sense the application of pressure. For instance, piezoelectric tablets could be positioned on the printed wiring board 12 to record depression of the keys 20. Therefore, pressure sensitive areas as used herein in reference to the wireless signal processing assembly, and its component parts, refers to a device, or collection of devices, or other structure capable of recording the application of pressure, typically produced by the depression or actuation of one of the keys, for the purpose of registering an input to the processing assembly.

Supported in an adjacent and relatively coplanar position with respect to the plunger mat 13 is a view screen support frame 27. The support frame supports the view screen 17 and associated electronic components needed for its operation. Also supported within the support frame 27 is an audio speaker assembly which is evident from a plurality of audio speaker openings 28. As is conventionally known, the speaker assembly generates sound in response to signals from the signal processing assembly. The openings 28 allow the sound to be easily heard by the user.

Figure 2:
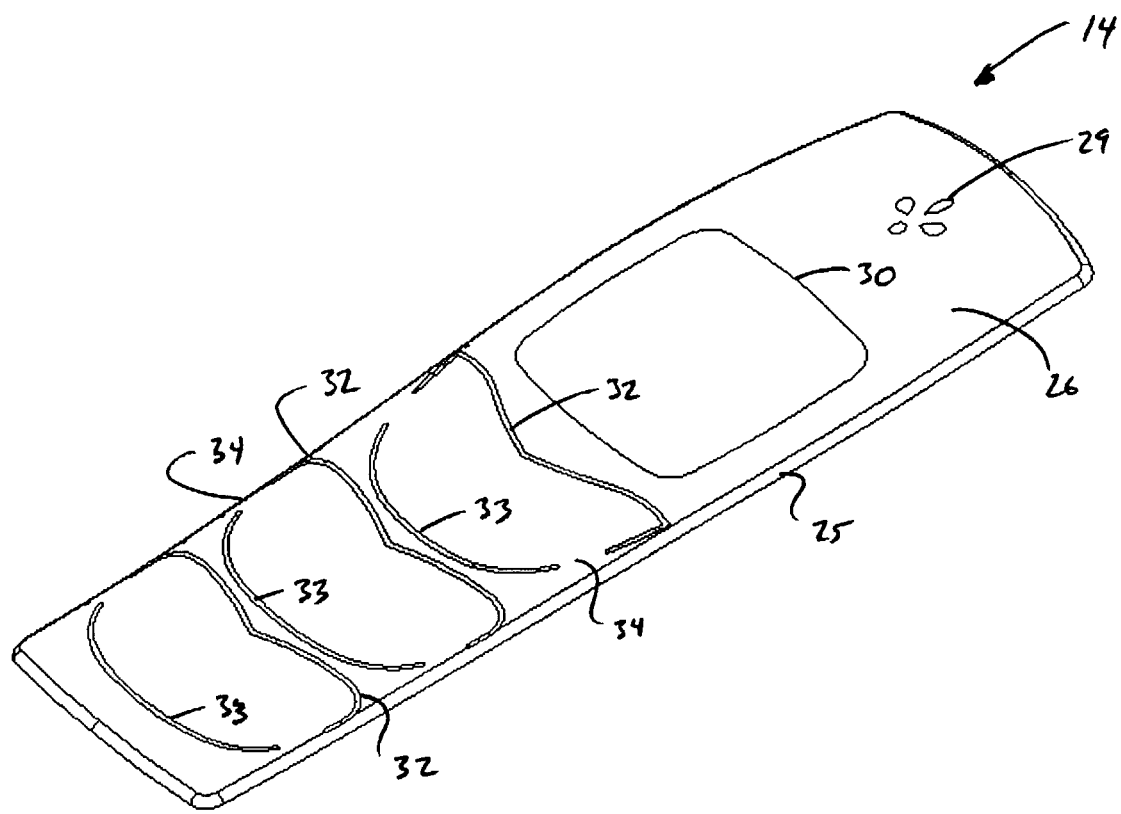
FIG. 2 is a perspective view of a film layer of the mobile station shown in FIG. 1.

As shown in FIG. 2, one embodiment of the film layer 14 is constructed of a thin layer of sheet material that extends substantially the length of the plunger mat 13, view screen 17 and bottom cover 11 over which it is to be positioned. The film layer 14 may include a rounded or chamfered peripheral edge 25 extending around and defining a relatively flat central portion 26. The central portion may define a second plurality of audio speaker openings 29 clustered together in a group to correspond to, and overlie, the openings 28 in the view screen support frame 27.

Also defined by the central portion 26 is a view screen opening 30 sized to receive or otherwise expose the view screen 17 over which the film layer 14 is positioned. In the illustrated embodiment, for example, the view screen opening 30 has a rectangular shape to match the generally rectangular shape of the view screen 17.

The central portion 26 of the film layer 14 also defines a number of regions that are generally associated with respective keys. Each region, as described below, is designed to be somewhat flexible or movable relative to other portions of the film layer such that the depression of a key activates a corresponding plungers and, in turn, a corresponding contact in the printed wiring board 12.

In the illustrated embodiment, the film layer defines a plurality of perforation lines. The perforation lines are in three pairs extending along the bottom half of the film layer 14. Each pair includes a first perforation line 32 and a second perforation line 33. The first perforation line 32 has a smoothly curving M-shape with the free-ends of the legs of the M extending towards the bottom of the mobile station 10. The second perforation line 33 extends in a smooth arc with its convex end directed downwardly, and its free ends extending in close proximity to the free ends of its respective first perforation line 32. The space between the free ends of the first and second perforation lines 32, 33 defines a film material tab 34.

Although the illustrated embodiment defines an M-shape and an arc shape, it should be noted that the perforation lines may have other shapes. In addition, it should be noted that each pair of first and second perforation lines 32, 33 has a shape that is congruent with the respective one of the keys 20 with which the regions of the film layer defined by the perforation lines is aligned. Advantageously, the perforation lines 32, 33 extend around the periphery of the keys 20 (each of which has a kidney shape), so that the perforation lines cannot be seen through the keys. The perforation lines 32, 33 provide areas of weakness for the keys so that a key press is transmitted through the film layer 14 to the plunger mat 13, and through to the selected one of the contacts 21.

Other configurations for the keys 20 could also be employed with the film layer 14. For instance, a separate key could be used with each number, symbol or other function, in which case there could be more perforations to define a different region of the film layer for every key. In another example, different key sizes could be used for different numbers or functions requiring larger and smaller regions defined by perforations.

Regardless of the particular configuration, the tab 34 between the free end pairs of the perforation lines 32, 33 serves to retain the portion of the film layer circumscribed by the perforation lines within the bounds of the perforation lines. As an alternative to the tabs, the perforation lines could be partial depth perforation lines that do not completely extend through the film layer 14. Even if the entire periphery of the keys were traced by partial depth perforation lines, the region of the film layer circumscribed by the perforation lines could be flexed while remaining attached to the remainder of the film layer.

As another alternative, the film layer 14 itself could be manufactured so as to have portions with selectively positioned areas of weakness or increased flexibility, such as by reducing the amount of cross-linking between polymer chains in areas positioned under or around the keys 20. As still another alternative, selected areas, i.e., those areas aligned with the keys 20, could be manufactured with a reduced thickness so as to allow improved transmission of key press forces.

A range of different materials may be used to construct the film layer 14 and the term "film" is used herein to broadly indicate any sheet material which is thin enough to deform or otherwise transmit pressure or movement of key presses. For instance, the film layer 14 could be constructed of a paper, elastomer, polymer and electric luminescent materials. Another desirable characteristic for the film layer is aesthetic appeal including its colors, patterns or the ability to bear marks or indicia. The film can be imbued with color or patterns through such processes as silk screening, dying processes, printing, or may inherently have the color and properties that make it visually appealing.

A specific example of a film material useable for the film layer 14 is Bayfol CR 1-4 which is an extruded film made from a polymer blend of polycarbonate (PC) and polybutyleneterephthalate (PBT) manufactured by BAYER. The nominal thickness of the film is 0.125±10% mm. Another example is a paper type film that is electric luminescent so as to form lighted patterns when subjected to an electrical current (available from Miller Engineering of New Canaan, Conn., USA).

Manufacture of the film layer 14 in one aspect includes taking blanks of film material, forming them in a compression molding process and then using a die to cut a film layer of the desired size and shape from the film blank. In addition, the die cut can define the audio speaker openings 29, the view screen opening 30 and the perforation lines 32, 33. In another example, the film layer 14 can be manufactured by injection molding the material in liquid form into a mold having a cavity shaped to form the film layer 14. The various openings can then be defined using a die, or may be part of the mold itself.

The film layer 14 preferably has a visually detectable characteristic that, as will be described in more detail later, can be seen through the overlying key mat 15 and/or top cover 16. Examples of such visually-detectable characteristics include indicia, such as the user's name, a company name, a trade mark or symbol, etc. Visually detectable characteristics also include colors, patterns, luminescence, reflective qualities, etc. Visually detectable characteristics, therefore, include any of a range of colors, images, indicia or other visible depictions or characteristics that allow improvement or customization of the mobile station's appearance or communicates information about the mobile station, such as an owner or distributor.

Figure 3:
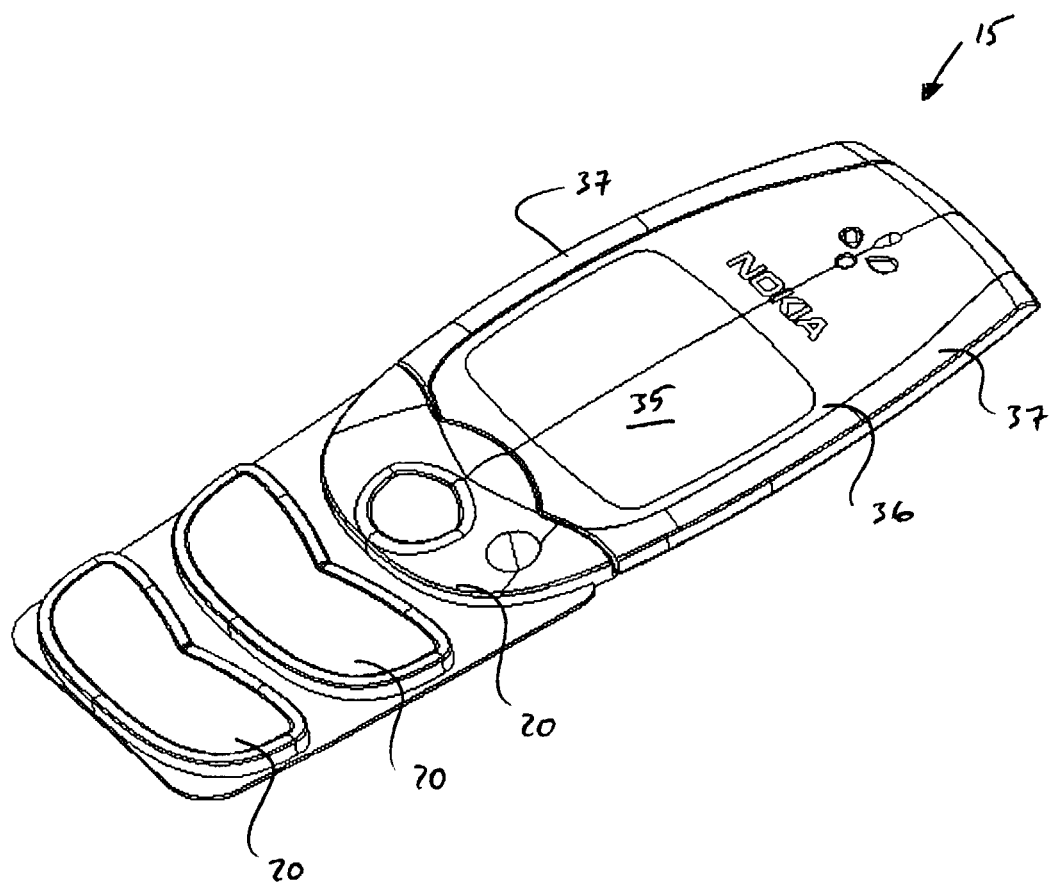
FIG. 3 is a perspective view of a key mat of the mobile station shown in FIG. 1.

Similar to the film layer 14, the key mat 15 has a shape, such as a rectangular shape, corresponding to the top cover 16, as shown in FIG. 3. The key mat includes multiple keys 20 and, in the illustrated embodiment, a transparent lens 35 designed to overlie the visual display 17. In the illustrated embodiment, the keys 20 are broad, kidney shaped keys extending between the left and right edges of the key mat 15. However, the key mat can include other numbers and types of keys such as a more conventional key mat including ten, twelve or more keys, ten of which are each associated with a respective numeral from 0 to 9.

Around the transparent lens is a frame or bezel 36 for supporting the lens 35. The bezel 36 also defines a cluster of audio speaker openings 40 that correspond in shape and position to the openings 29 in the film layer 14.

Each of the keys 20 of the illustrated embodiment is capable of depressing multiple ones of the plungers 22, and in particular, the bottom two keys are each capable of selectively transmitting pressure to any one of six plungers. As described below, however, each key can correspond to a different number of plungers, as desired, or even a single plunger. Ten of the twelve plungers selectable by the bottom two keys typically correspond to Arabic numerals used to dial telephone numbers, but of course can be customized with different functions or different numbering or lettering. In fact, such functions could be indicated by indicia on the underlying portions of the film layer 14. The remaining two plungers are typically used to activate special symbols such as the "*" and "#" symbols. The top key corresponds to four plungers that are generally allocated to an answer/hang up key and menu selection keys allowing the user to page through various menus on the screen 17.

In the illustrated embodiment, the keys 20 are constructed of a transparent material that renders the film layer 14 clearly visible. Preferred materials for the keys 20 include a clear silicone material or other transparent or partially translucent (i.e., permits the passage of some light) material with sufficient elasticity to locally deform when pressed with a fingertip. The clear silicone has the advantage of being completely transparent and relatively elastic so that individual ones of the plungers 22 may be depressed without exerting sufficient pressure on the remaining plungers under the key to activate the remaining plungers. Advantageously, having each key cover several of the plungers allows the keys to be relatively large and when combined with transparency, gives a clear view of any visible characteristics of the film layer 14.

It should be noted that the keys 20 could also be smaller or larger, and have different shapes, depending upon the number of plungers 22 depressible by the keys. For instance, a one-to-one ratio of keys to plungers could be used wherein the keys 20 need not have any flexibility at all and could be made of a transparent polycarbonate, glass or other material. Of course, unlike the illustrated multiple plunger keys, larger indicia or symbols may not be as clearly visible through the relatively smaller keys.

In addition, at least a portion 37 of the bezel 36 may also be constructed of a transparent material to allow the film layer to be visible. The clear or partially translucent bezel portion can be constructed of a relatively hard plastic or polymer matched to the properties of the remaining portions of the bezel. As another alternative, the entire key mat 15 may be constructed of one or more transparent or translucent materials. Notably, even when the entire key mat is transparent, if the top cover is not transparent, the perforation lines 32, 33 will not be visible.

A user can therefore change the appearance of the mobile station 10 by first detaching the top cover 16 from the bottom cover 11 revealing the internal components. The key mat 15 is removed from the existing film layer 14 if there is film layer, or from the plunger mat 13 if there is no film layer. The new film layer 14 is then positioned over the plunger mat 13 so that the perforation lines 32, 33 extend around the respective groups of plungers 22 corresponding to the keys 20.

The key mat 15 is positioned so that the keys 20 fall within the borders of the perforation lines 32, 33 and the top cover 16 is reattached to the bottom cover 11, typically snapping on through an interference fit, or being more firmly attached with fasteners. As the top cover 16 is attached, it is positioned so that the keys 20 extend through the-key openings 19 and the view screen 17 can be seen through the display opening 18. In this manner, the portions of the cover 16 that extend between the key openings block visibility of the perforation lines 32, 33. After reassembly, the appearance of the mobile station 10 has been changed by the new visual characteristics of the film layer 14 which can be seen through the clear keys 20 and the clear bezel portion 37. The user can subsequently again change the film layer if the user desires to further alter the appearance of the mobile station.

Illustrated in FIG. 4 is an alternative embodiment of the mobile station 10 that includes a film layer 14 manufactured in two separate portions or sheets. A first sheet 38 is positioned to correspond to a view screen 17 and supporting frame 27 that are disposed in a separate plane displaced from the plunger mat 13. The first sheet defines the view screen opening 30 similar to the embodiment in FIG. 1. A second sheet 39 extends over the plungers and unlike the embodiment illustrated in FIG. 1, does not include perforation lines 32, 33. Perforation lines are not needed for the second sheet 39 to transmit movement to the plungers 22 because the bottom sheet has been die cut but not molded so that it remains relatively flat. Generally, a relatively flat film layer 14 will be more flexible than a film layer of identical sheet material that has been molded.

In another embodiment, an end-user of the mobile station 10 can be empowered to customize the mobile station by manufacturing his or her own film layer 14. For instance, the end-user may be provided with a kit including film material blanks and a die configured to cut the blanks into the shape necessary for use as the film layer. The material blanks may be printed using a desktop printer so that they bear indicia, symbols or other visual cues designed by the user (e.g., a monogram of the user's name positioned to be under each of the keys 20). Alternatively, the end-user may obtain their own materials for construction of the blanks so as to have truly one-of-a-kind colors, patterns and other visible characteristics for individualizing the mobile station 10. Preferably, for less flexible materials the dies include edges for defining the perforation lines 32, 33.

The present invention has many advantages. The film layer 14 allows quick, easy and inexpensive changes to the appearance of a mobile station 10. Customization can even be performed on an individual level using practically any available film material. Also, the film material may bear indicia or symbols of ownership so as the promote a distributor or third-party. The indicia may also indicate functions of the various keys 20 beneath which they appear. Separation of the plunger mat 13 from the key mat 15 allows the film layer 14 to be seen through the keys 20. Use of a transparent silicone or other transparent or partially translucent material for the key mat 15 promotes visibility of the film layer 14. In addition, use of broad keys 20 that cover multiple plungers 22 allows the film layer of one embodiment to be seen in relatively large, unbroken portions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile station for sending and receiving wireless communication signals, said mobile station comprising:
    a housing comprising a first cover and a second cover, said first and second covers configured to mate to form the housing, wherein said first cover has at least one translucent portion;
    a wireless communications signal processing assembly positioned in the housing, said processing assembly having a plurality of pressure-sensitive areas, each of said pressure sensitive areas configured to register an input;
    a film layer positioned in the housing so as to overlie the signal processing assembly, said film layer including at least one visually detectable characteristic and configured to be positioned in the housing by a user of the mobile station; and
    a key mat positioned in the housing so as to overlie the film layer, said key mat having a plurality of keys, wherein each of the keys is positioned relative to a corresponding one of the pressure sensitive areas so that depression of a key deflects a portion of the film layer and similarly depresses the corresponding pressure-sensitive area, wherein the key mat and film layer are configured to allow observation of the visually detectable characteristic through the translucent portion of the first cover, and wherein at least one of the keys of the key mat is sufficiently translucent to allow observation of the visually detectable characteristic.

2. A mobile station of claim 1, wherein the processing assembly includes a plunger mat positioned in the housing and having a plurality of plungers and wherein the film layer is positioned to overlie the plunger mat, said plungers defining portions of the pressure sensitive areas.

3. A mobile station of claim 2, wherein the processing assembly includes a printed wiring board having a plurality of contacts and wherein the plungers of the plunger mat are correspondingly positioned so as to overlie the contacts, said contacts and plungers defining the pressure sensitive areas.

4. A mobile station of claim 1, wherein the film layer includes weakened areas in proximity to the keys.

5. A mobile station of claim 4, wherein the weakened areas are perforations defined by the film layer.

6. A mobile station of claim 5, wherein the perforation lines extend around at least a portion of a periphery of each of the keys.

7. A mobile station of claim 4, wherein the weakened areas have greater flexibility than the remainder of the film layer.

8. A mobile station of claim 4, wherein the weakened areas are thinner than the remainder of the film layer.

9. A mobile station of claim 1, wherein the film layer is constructed of any one of a paper, elastomer, polymer and electric luminescent materials.

10. A mobile station of claim 1, wherein the key mat is constructed of an optically clear silicone.

11. A method of changing a visual appearance of a mobile station, said method comprising:
    positioning a film layer having a visually detectable characteristic over a plurality of pressure sensitive areas of a wireless signal processing assembly; and
    aligning a plurality of keys of a key mat over the film layer so that each of the keys is positioned in correspondence to at least a respective one of the pressure sensitive areas, wherein at least one of the keys is at least partially translucent such that the visibly detectable characteristic of the film layer can be perceived,
    wherein the film layer and the keys are disposed within a housing, and the visibly detectable characteristic of the film layer can be perceived through at least a portion of the housing of the mobile station.

12. A method of claim 11 further comprising opening the housing and separating the key mat from the wireless signal processing assembly before positioning the film layer therebetween.

13. A method of claim 12, wherein separating the key mat includes separating the key mat from a plunger mat that overlies the wireless signal processing assembly and wherein aligning the keys includes aligning the keys in correspondence with the respective plungers of the plunger mat.

14. A film layer for altering a visual appearance of a mobile station, said film layer configured to be positioned within a housing of the mobile station formed by a first cover and a second cover, said film layer sized to extend over a plurality of plungers of a plunger mat, said film layer comprised of a flexible material configured to allow sufficient deflection of the film layer when a key of a key mat is pressed to depress a corresponding one of the plungers, and said film layer also comprising a visually detectable characteristic that is configured to be viewed through the key mat and at least a portion of the first cover.

15. A film layer of claim 14, further comprising weakened areas in proximity to the keys.

16. A film layer of claim 15, wherein the weakened areas are perforations defined by the film layer.

17. A film layer of claim 16, wherein the perforation lines extend around at least a portion of a periphery of each of the keys.

18. A film layer of claim 15, wherein the weakened areas have greater flexibility than the remainder of the film layer.

19. A film layer of claim 15, wherein the weakened areas are thinner than the remainder of the film.

20. A film layer of claim 14, wherein the film layer is constructed of any one of a paper, elastomer, polymer and electric luminescent materials.

21. A method of claim 11, said method further comprising removing a first film layer from within the mobile housing and positioning a second film layer having a visually detectable characteristic over the plurality of pressure sensitive areas of the wireless signal processing assembly to change the visual appearance of the mobile station.

* * * * *